(12) United States Patent
Castellani

(10) Patent No.: US 6,431,059 B1
(45) Date of Patent: Aug. 13, 2002

(54) SPHERICAL, FOOD PRODUCT BAKING DEVICE

(76) Inventor: Sandra L. Castellani, 119 Rick Rd., Alexandria Township Milford, NJ (US) 08848

( * ) Notice: Subject to any disclaimer, the term of this patent is extended or adjusted under 35 U.S.C. 154(b) by 0 days.

(21) Appl. No.: 09/839,110

(22) Filed: Apr. 20, 2001

(51) Int. Cl.[7] ............................. A47J 37/00; A23P 1/00
(52) U.S. Cl. ............................. 99/440; 99/444; 99/426; 220/4.25; 220/4.22; 220/912
(58) Field of Search .................... 99/426, 440, 444, 99/446, 445, 439, 381, 380, 375, 413, 416, 448; 220/4.25, 4.22, 573.1, 4.23, 912

(56) References Cited

U.S. PATENT DOCUMENTS

| | | | | |
|---|---|---|---|---|
| 936,965 A | * | 10/1909 | Wells | 126/369 |
| 1,234,407 A | * | 7/1917 | Stiga | 425/233 |
| 2,236,992 A | * | 4/1941 | Broadley | 126/19 R |
| 4,662,273 A | * | 5/1987 | Marchioni | 219/386 |
| 5,176,067 A | * | 1/1993 | Higgins | 126/25 R |

* cited by examiner

Primary Examiner—Reginald L. Alexander
(74) Attorney, Agent, or Firm—Kenneth P. Glynn, Esq.

(57) ABSTRACT

The present invention is a device for baking spherical food products. It includes a main support, made of material capable of sustaining a temperature of at least 500 degrees Fahrenheit, which has an outer perimeter for nesting atop a pan or its equivalent, e.g., a cake pan, brownie pan, cookie tin, a pot, a frying pan, or even a piece of aluminum foil folded on its edges to act like a pan. The primary purpose of the pan is to receive and hold grease and drippings from the food products being cooked in the present invention devices. The main support of the present invention device includes a plurality of semispherical recesses, each having a predetermined outer radius, and being located on the main support, typically in an orderly fashion, and having a plurality of drainage holes located thereon. The invention may be formed of a high temperature tolerant material such as metal, ceramic and glass, and may also have a non-stick coating.

13 Claims, 3 Drawing Sheets

SPHERICAL, FOOD PRODUCT BAKING DEVICE

BACKGROUND OF THE INVENTION

1. Field of the Invention

The present invention relates to cooking spherical food products, such as meatballs, shrimp balls, cakeballs, Swedish meatballs, fish balls and the like. More specifically, the present invention device is a device which could be used over an open flame, over a flat grill, or in an open or closed pan, but is primarily to be used in an oven. The present invention device is uniquely structured to hold spherical food products, semi-spherical food products and similarly shaped food items, and provides for heat application and simultaneous grease drainage. Thus, the present invention aids in the preparation of the aforementioned types of foods in a fat-removing manner to yield healthier results. For example, frying of meatballs and the grease that they soak in during frying is substantially reduced or eliminated.

2. Information Disclosure Statement

Meatballs are traditionally hand made (hand rolled), fried and then sauteed in sauce or served with sauce as a side dish. Fishballs and shrimp balls are made like shrimp toast and are deep fried and cooking grease-laden. These items are not normally baked and traditional frying apparatus is used.

On the other hand, there are many devices available for baking, such as Corningware by Corning Glass of Corning, N.Y., baking pans shaped for pies, cupcakes, ring cakes, etc., but none for baking spherical food products with grease drainage provisions as in the present invention.

Notwithstanding the prior art, the present invention is neither taught nor rendered obvious thereby.

SUMMARY OF THE INVENTION

The present invention is a device for baking spherical food products. It includes a main support, made of material capable of sustaining a temperature of at least 500 degrees Fahrenheit, which has an outer perimeter for nesting atop a pan or its equivalent, e.g., a cake pan, brownie pan, cookie tin, a pot, a frying pan, or even a piece of aluminum foil folded on its edges to act like a pan. The primary purpose of the pan is to receive and hold grease and drippings from the food products being cooked in the present invention devices.

The main support of the present invention device includes a plurality of semispherical recesses, each having a predetermined outer radius, and being located on the main support, typically in an orderly fashion, and having a plurality of drainage holes located thereon.

In some embodiments of the present invention, the device main support and the plurality of semispherical recesses are unistructurally formed, that is, they are made out of a single piece of metal, ceramic or glass. Alternatively, the device may be made of separate, assembled pieces. Thus, the present invention may be formed of a high temperature tolerant material such as metal, ceramic and glass. The device may also have a non-stick coating. In some cases, the present invention device may be made of strong, disposable metal foil, such as is used for disposable turkey roasting pans.

In some preferred embodiments, the device main support may be a solid, flat structure, and the plurality of recesses located thereon, arranged in a predetermined pattern. For example, the predetermined pattern may be in rows and columns, i.e., having a generally rectangular periphery. One preferred embodiment is an array of drainage holes of three rows with four drainage holes in each row. In other embodiments, a pan is included which has a solid bottom and walls which have a height which greater than the outer radius of the plurality of semispherical recesses so as to support the main support and plurality of drainage holes to permit drainage of cooking liquids of a product cooked therein away from the recesses.

The device may have plurality of drainage holes having a preset diameter, e.g., of about ⅛ of an inch. A preferred arrangement is where there is one drainage hole located at a center low point and a plurality of additional drainage holes located radially outwardly therefrom.

The present invention includes embodiments where the device relies upon its own support to sit up off a drain-receiving surface. Thus, the device may further include a plurality of legs extending downwardly from the main support. Typically, these legs are each of a length greater than an outer radius of the spherical recesses.

BRIEF DESCRIPTION OF THE DRAWINGS

The present invention should be more fully understood when the specification herein is taken in conjunction with the drawings appended hereto wherein:

FIG. 5 shows alternative embodiment of a present invention device as a self-supporting product; and, FIG. 6 illustrates another embodiment of the present invention which is especially useful for rotisserie ovens and the like.

DETAILED DESCRIPTION OF THE PRESENT INVENTION

Figure 1:
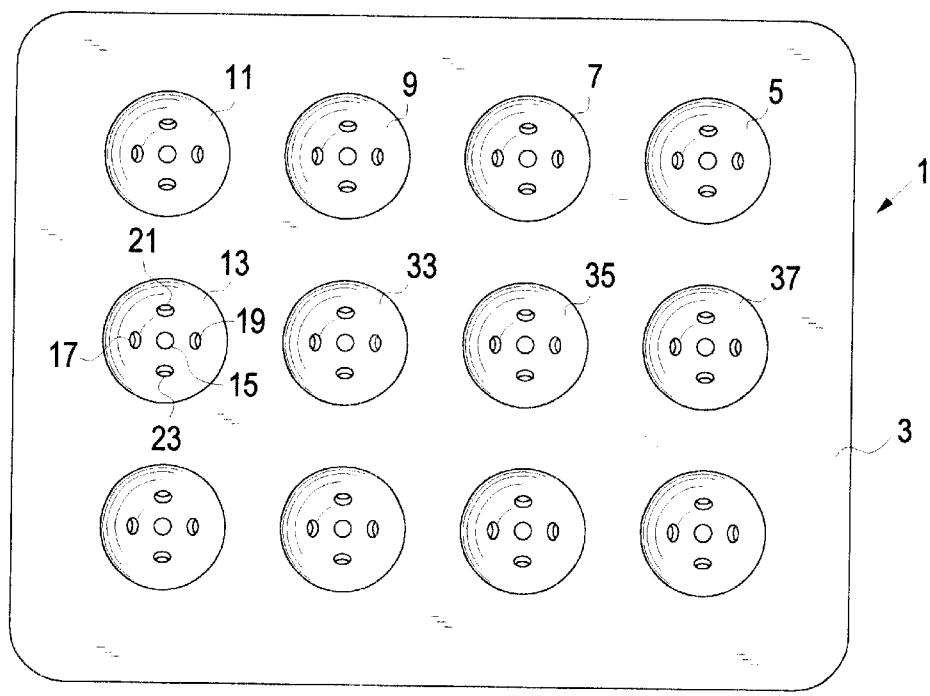
FIG. 1 shows a top view and FIG. 2 shows a side cut view of one embodiment of the present invention device for mounting within a rectangular baking pan, as shown in a side cut view, in FIG. 3.
Figure 2:
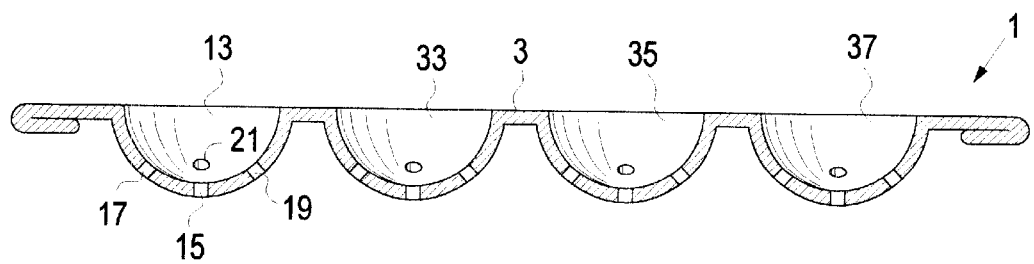

The present invention device is shown in one preferred embodiment in FIGS. 1 through 4, wherein identical components are identically numbered. FIG. 1 shows a top view, and FIG. 2 shows a side cut view, of present invention device 1, which includes a main support 3, in this case a flat, smooth plate. It contains a plurality of recesses, such as recesses 5, 7, 9, 11, 13, 33, 35 and 37, which have predetermined inner and outer radii. Here, for example, the outer radii are all the same, although they could be different and still remain within the scope of the present invention. Recess 13 is typical and has a single, central drainage orifice at its lowest point, i.e., orifice 15. Orifice 15 is symmetrically surrounded by additional drainage orifices 17, 19, 21 and 23, as shown. This device 1 may be placed in any type of pan which will take the heat of baking will containing the drippings of such food products as meatballs and fish balls.

Figure 3:
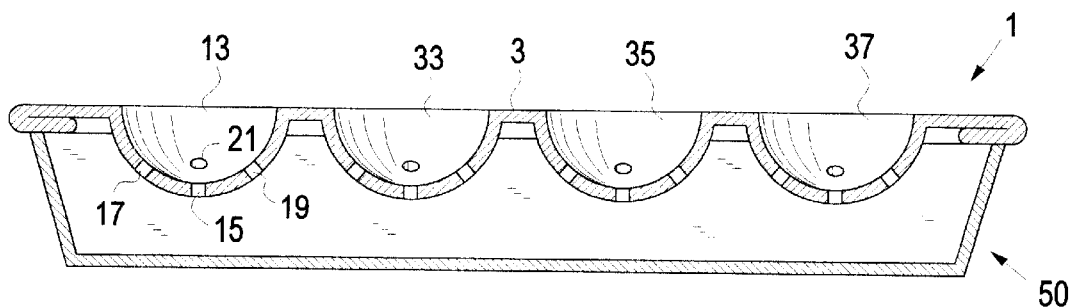

In FIG. 3, two concepts are illustrated. First, it shows how a present invention is used in nesting atop a pan. Second, it illustrates that the present invention could embody in some instances, both the device shown in FIG. 1 and a pan, in combination. Here, device 1 rests atop brownie pan 50, as shown.

Figure 4:
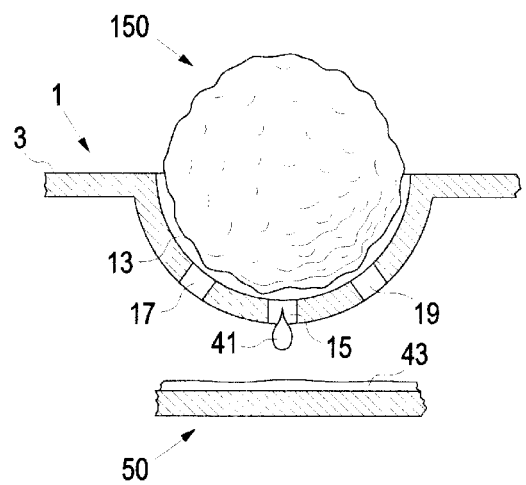
FIG. 4 illustrates a side cut view of a portion of the device shown in the above Figures, but containing a cooking, grease-dripping meatball.

FIG. 4 shows a side, cut, blown-up, partial view of device 1, and illustrates a meatball 150 in recess 13 during baking (cooking). Although baking is preferred, i.e., cooking in the oven, cooking on stovetop, crock pot or any other cooking technique could be used. Thus, in FIG. 4, meatball 150 is cooking and grease drippings 41 falls into grease pool 43 on the bottom of pan 50.

Figure 5:
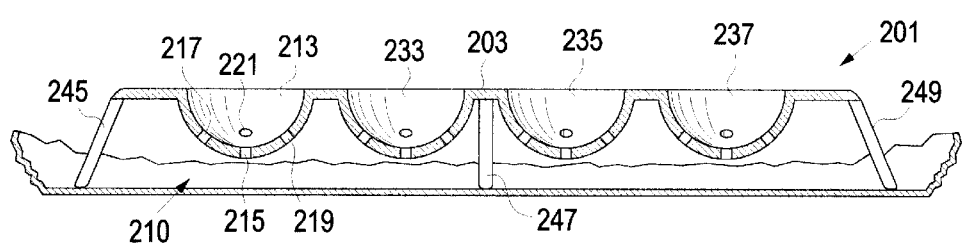

In FIG. 5, an alternative embodiment present invention device 201 is shown in a side, cut view. Device 201 has a main support 203, which again is shown flat, but could be wavy, bulging, tiered, or of any other configuration, even perforated or formed of wire or open grid, provided that it had sufficient structural integrity to support the recesses. It includes a plurality of recesses, such as recesses 213, 233, 235 and 237. In this embodiment, there is a plurality of legs, exemplified by legs 245, 247 and 249. These legs are of sufficient height to raise device 201 above pan 210 so that the bottom of the individual semispherical recesses are above and do not touch the pan 210, thereby keeping the food item, e.g., meatballs, away from the drippings. Also, it should be noted that pan 210 could be metal foil on a grill.

Figure 6:
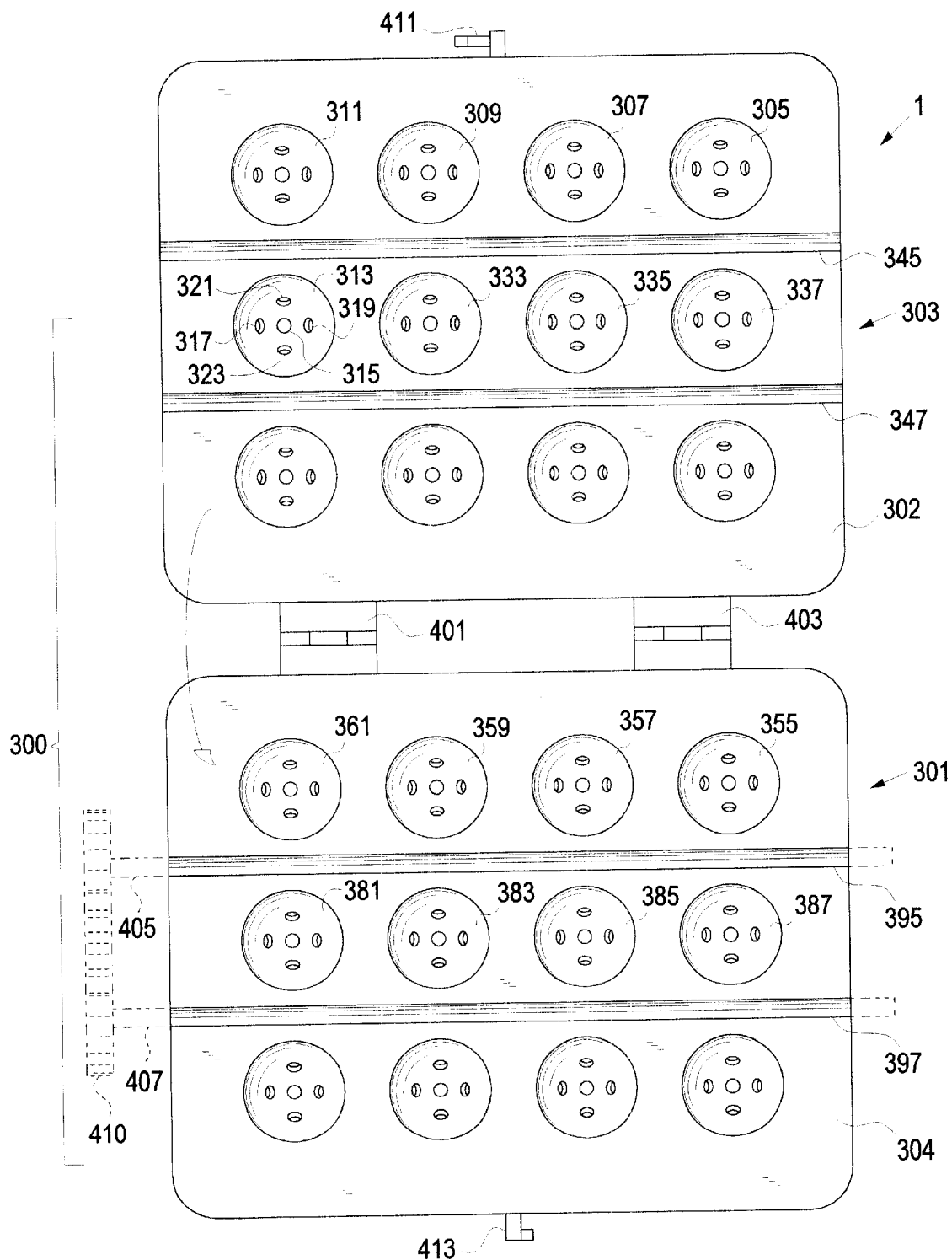

FIG. 6 illustrates another embodiment of the present invention which is especially useful for rotisserie ovens and the like. Here two separate units similar to the single unit shown above, have been hinged together. Thus, unit 301 and unit 303 are connected by hinges 401 and 403, as shown. Units 301 and 303 contain a plurality of semispherical recesses, such as recesses 305, 307, 309, 311, 313, 333, 335, 337, 355, 357, 359, 381, 383, 385 and 387. (These semispherical recesses could be irregular, distorted, dimpled, have protrusions, corners or serrations and still be generally semispherical and within the scope of the present invention.) Typical is recess 321, with drainage orifices 315, 317, 319, 321 and 323.

Unit 301 of present invention device 300, contains optional elongated troughs 395 and 397, and unit 303 contains optional elongated troughs 345 and 347, adapted to receive rotisserie rods or skewers, such as rods 405 and 407 of rotisserie rack wheel 410. When using this embodiment, a cook will place food items in the recesses, and then simply close the two units 301 and 303 together and latch device 300 together with latch 411 and latchpin 413; the device may then be placed in or on a rotating rack and the food items cooked as desired, with the grease and other drippings simply falling away during cooking. Alternatively, rods 405 and 407 are places into the elongated troughs and then device 300 is latched and the device with the wheel 410 is placed in a rotisserie oven for cooking.

Obviously, numerous modifications and variations of the present invention are possible in light of the above teachings. It is therefore understood that within the scope of the appended claims, the invention may be practiced otherwise than as specifically described herein.

What is claimed is:

1. A device for cooking spherical food products, which comprises:

two units hingedly connected to one another, each unit including the following elements:
  (a) a main support, made of material capable of sustaining a temperature of at least 500 degrees Fahrenheit;
  (b) a plurality of semispherical recesses, each having a predetermined outer radius, and being located on said main support and having a plurality of drainage holes located thereon;
    wherein said units are connected to one another so as to form a plurality of spherical recesses when the two units are closed toward one another.

2. The device of claim 1 wherein said main support and said plurality of semispherical recesses of each unit are unistructurally formed.

3. The device of claim 1 wherein said device is formed of a high temperature tolerant material selected from the group consisting of metal and glass.

4. The device of claim 3 wherein said device is made of metal.

5. The device of claim 4 wherein said metal device has a non-stick coating.

6. The device of claim 1 wherein said main support of each unit is a solid, flat structure, and said plurality of recesses located thereon are arranged in a predetermined pattern.

7. The device of claim 6 wherein said predetermined pattern has a generally rectangular periphery.

8. The device of claim 1, which further includes:
  (c) a pan having a solid bottom and having walls which have a height which is greater than the outer radius of said plurality semispherical recesses so as to support said two units hingedly connected to one another, to permit drainage of cooking liquids of a product cooked therein away from said recesses.

9. The device of claim 8 wherein there is one drainage hole located at a center low point and a plurality of additional drainage holes located radially outwardly therefrom.

10. The device of claim 1 wherein said device further includes a plurality of legs extending downwardly from said main support of each said two units.

11. The device of claim 10 wherein said plurality of legs are each of a length greater than an outer radius of said spherical recesses.

12. The device of claim 1 wherein one of said two units includes a male component of a latching member and the other of said two units contains a female component of a latching member.

13. The device of claim 1 wherein said device is adapted to receive at least one skewer for rotisserie connection.

* * * * *